United States Patent [19]

Fogg, Jr. et al.

[11] 4,119,164

[45] Oct. 10, 1978

[54] STAND-AID INVALID WHEELCHAIR

[75] Inventors: Robert K. Fogg, Jr., San Diego; Christopher P. Staehli, Monterey, both of Calif.

[73] Assignee: The United States of America as represented by the Secretary of the Navy, Washington, D.C.

[21] Appl. No.: 820,964

[22] Filed: Aug. 1, 1977

Related U.S. Application Data

[62] Division of Ser. No. 625,220, Oct. 23, 1975, Pat. No. 4,054,319.

[51] Int. Cl.[2] .............................................. B62D 11/04

[52] U.S. Cl. ............................... 180/6.5; 180/DIG. 3

[58] Field of Search ...................... 180/1, 6.5, DIG. 3; 297/353, 384, DIG. 10, DIG. 4, 685; 5/89

[56] References Cited

U.S. PATENT DOCUMENTS

| | | | |
|---|---|---|---|
| 608,359 | 8/1898 | Bower | 297/384 X |
| 2,278,890 | 4/1942 | May | 297/358 X |
| 2,309,464 | 1/1943 | Lucci et al. | 5/89 |
| 2,572,149 | 10/1951 | Hind et al. | 297/DIG. 10 |
| 3,550,952 | 12/1970 | Ferguson | 297/685 |
| 3,787,089 | 1/1974 | Werthander | 297/DIG. 10 |
| 3,907,051 | 9/1975 | Weant | 180/DIG. 3 |
| 3,914,808 | 10/1975 | Woods | 5/89 X |
| 3,964,786 | 6/1976 | Mashuda | 297/DIG. 10 |

FOREIGN PATENT DOCUMENTS

| | | | |
|---|---|---|---|
| 1,951,119 | 5/1970 | Fed. Rep. of Germany | 297/DIG. 10 |

*Primary Examiner*—Kenneth H. Betts
*Attorney, Agent, or Firm*—R. S. Sciascia; G. J. Rubens

[57] ABSTRACT

A wheelchair is designed to enable an invalid to stand, sit or choose at will any intermediate position to perform useful work, and to move about in any of said positions. The wheelchair helps to fulfill the psychological and physiological needs of handicapped persons. The lifting and lowering operations are so arranged that practically no dislocation of the invalid's clothes occurs during the operations. The wheelchair has a minimum of physical encumbrances permitting the invalid to function near normally in the average living or working spaces.

6 Claims, 6 Drawing Figures

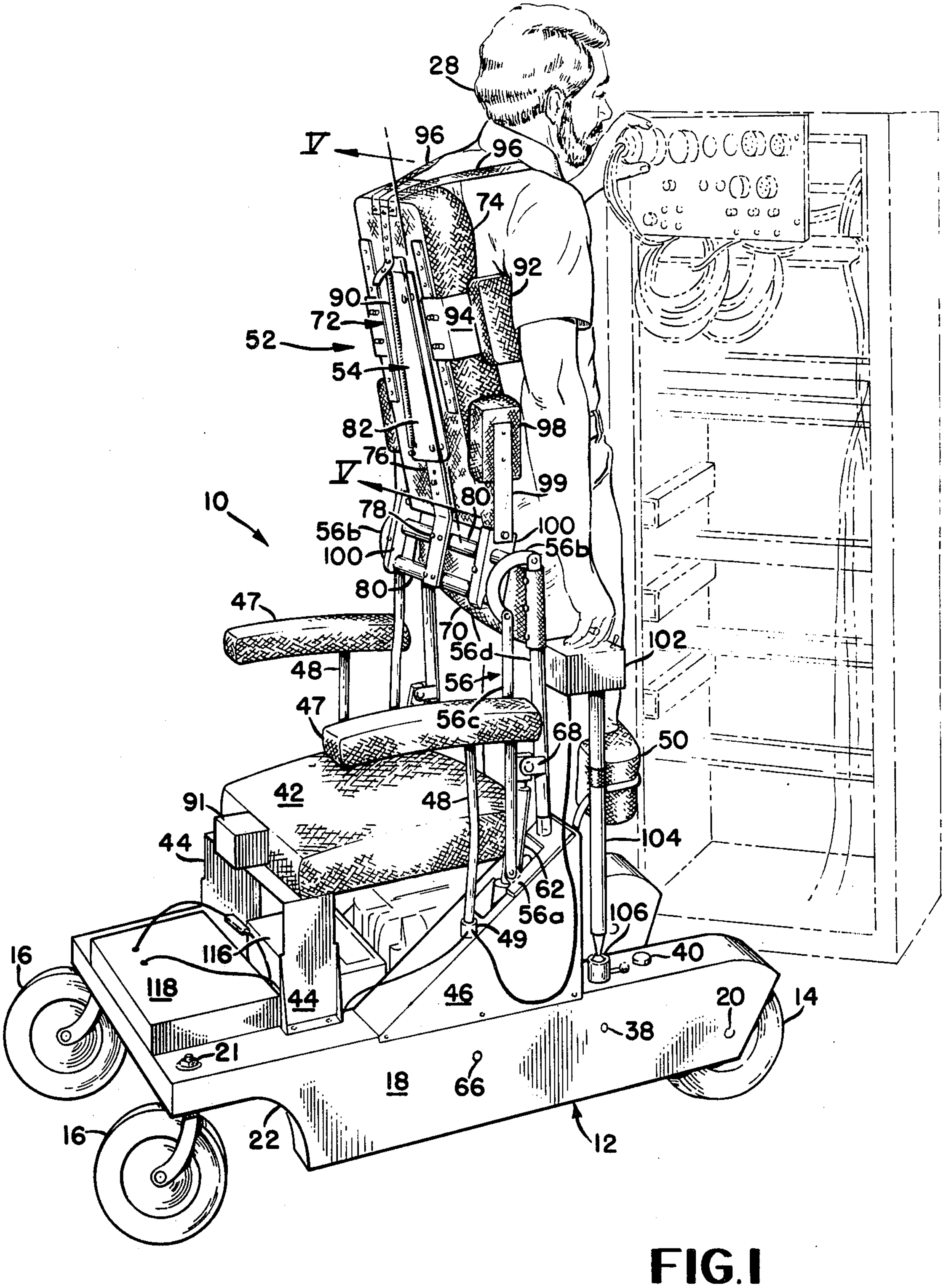
FIG. I

STAND-AID INVALID WHEELCHAIR

CROSS-REFERENCE TO RELATED APPLICATION

This application is a division of applicant's patent application Ser. No. 625,220 filed Oct. 23, 1975, now U.S. Pat. No. 4,054,319.

BACKGROUND OF THE INVENTION

This invention relates to wheelchairs, and more particularly to a wheelchair which can elevate its occupant from a sitting position to any position up to a normal standing position, at which positions the wheelchair can be moved about to enable the occupant to perform useful work.

Numerous types of wheelchairs have been designed in an effort to accommodate the needs for the orthopedically disabled. Both special purpose and general purpose wheelchairs have been designed, with varying degrees of success. Wheelchairs have been previously developed which are able to manipulate the handicapped person into the upright position, but all are deficient for at least one of the following considerations:

Firstly, the prior art wheelchairs do not permit the occupant to ambulate in the selected elevated position. Secondly, they encumber movement of the occupant, preventing him from performing useful work, either standing or sitting. Thirdly, they do not permit the occupant's skeleton to support natural occurring forces during the standing process.

SUMMARY OF THE INVENTION

The novel wheelchair consists of a unitary chassis and body supporting a fixed seat and fixed arm rests. The chassis is provided with front and rear wheels, the front wheels being differentially powered and controlled, the rear wheels being castored. The occupant is lifted out of the fixed seat by means of an elevating mechanism which includes a backrest, linkage system, and incorporated seat strap which raises and lowers the occupant to a normal standing or sitting position, respectively, without the aid of others. The standing mechanism provides the necessary support and body restraint fixtures needed to stabilize a paralyzed occupant.

The lifting linkage and the backrest, which is vertically slidably mounted, cooperate in a manner to minimize friction between the occupant's clothes and the lifting mechanism that might otherwise cause relative movement of the occupant's clothes during the lifting and lowering maneuver. The elevating linkage, drive mechanism, and the wheelchair drive mechanism are totally enclosed within chassis fenders to provide maximum safety.

STATEMENT OF THE OBJECTS OF THE INVENTION

A principal object of this invention is to provide a wheelchair that is designed to better help fulfill the psychological and physiological needs of handicapped persons.

Another important object of this invention is to provide a wheelchair with a mechanism that lifts and lowers the invalid to and from a standing position in a natural and comfortable manner with a minimum of physical encumbrances, and without the need for assistance by others.

A further important object is to provide a wheelchair that can be driven with the invalid in a standing position with maximum stability.

Other objects, advantages and novel features of the invention will become apparent from the following detailed description of the invention when considered in conjunction with the accompanying drawings.

BRIEF DESCRIPTION OF THE DRAWINGS

FIG. 1 is a rear perspective view of the novel wheelchair showing an invalid supported therein in a standing position so as to be free to perform work on an electronic cabinet.

DESCRIPTION OF THE PREFERRED EMBODIMENT

Figure 2:
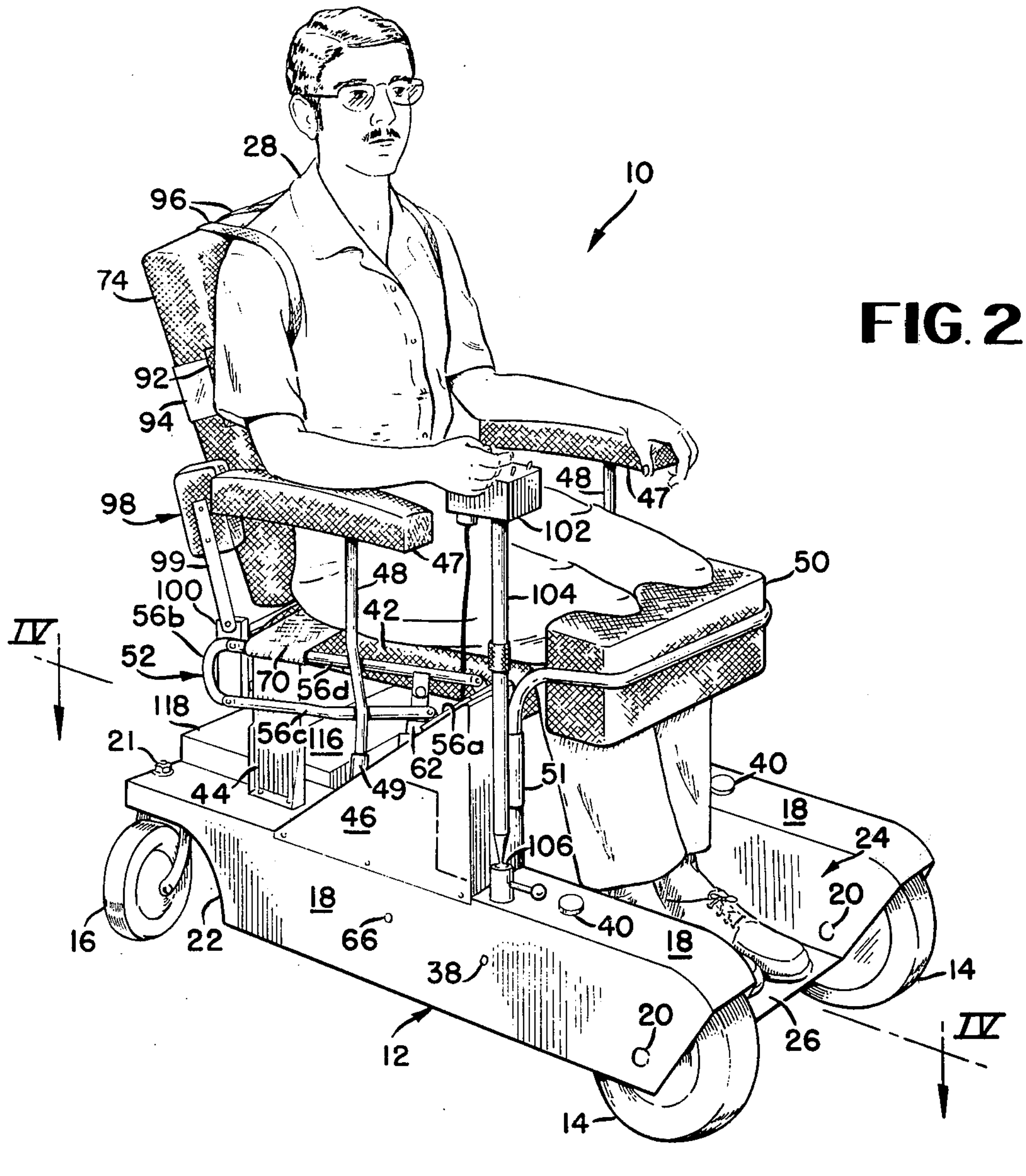
FIG. 2 is a front perspective view of the wheelchair of FIG. 1 showing the invalid supported in a sitting position.
Figure 3:
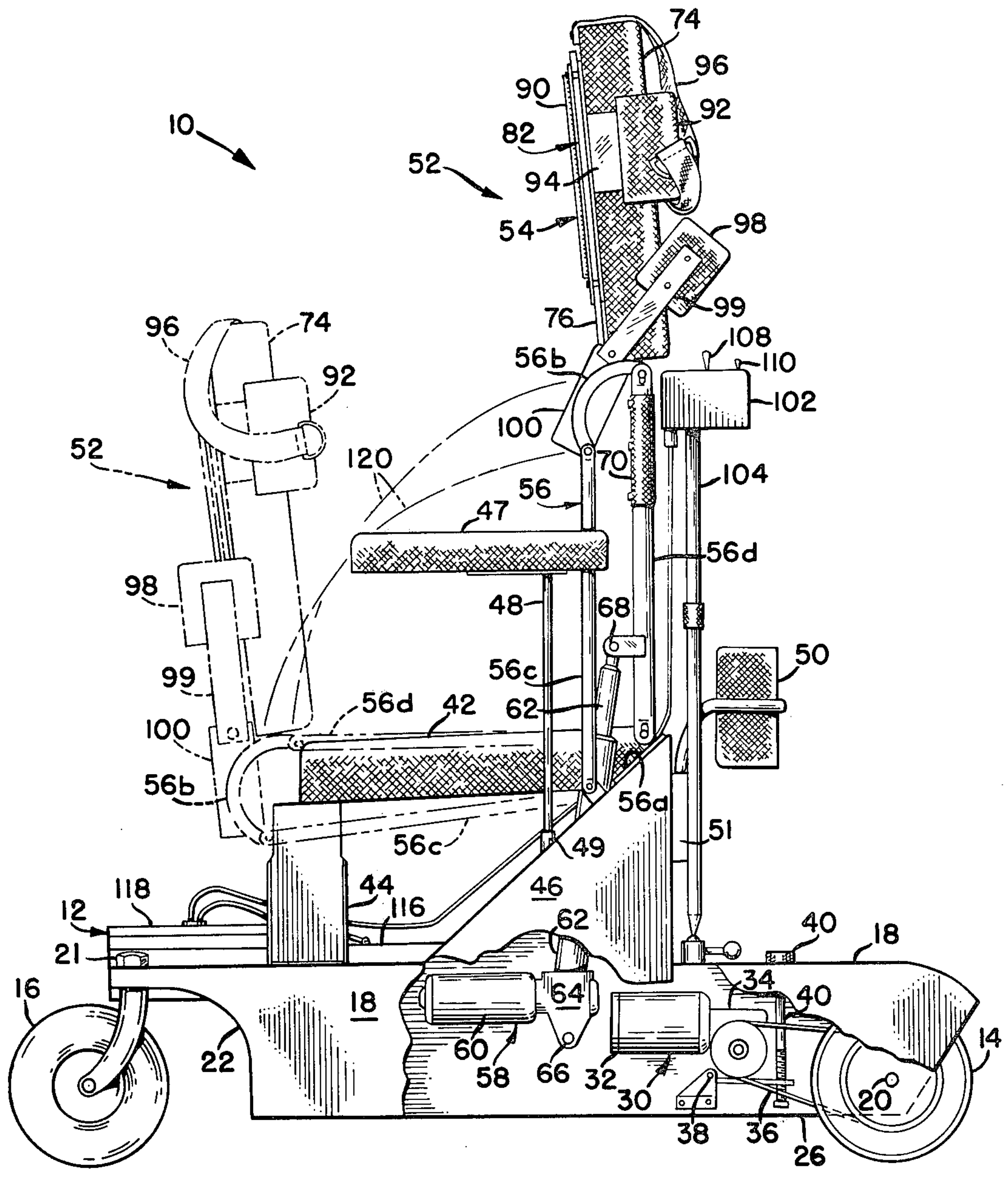
FIG. 3 is a side elevation view of the wheelchair with the chassis partially sectioned to show the drive means and the lifting mechanism, the latter being illustrated in the sitting and standing positions.

Referring to the drawings where like reference numerals refer to similar parts throughout the drawing, there is shown in FIGS. 1–3 a novel wheelchair 10 having a chassis 12 fabricated with a unitary body on which are mounted a pair of front drive wheels 14, and a pair of rear wheels 16, the latter being preferably of the free wheeling caster type. The chassis body is formed with a pair of fenders 18 which enclose the front wheels and their respective drive mechanisms, and to which the front drive wheels are independently journalled by axle 20. The castors 16 are journalled to the top of the fenders at 21. This arrangement is a safety feature to the occupant in that all moving parts of the wheelchair are enclosed. The rear portion of the fenders are cut out at 22 to allow free rotations of castors 16.

As is clearly shown in FIG. 2, chassis body is recessed at 24 forming a low platform 26 between the fenders extending substantially over the axis of rotation of the front wheels, which construction enhances stability for the invalid occupant 28 when in a standing position during wheelchair movement, as will be later described. This construction also lowers the center of gravity of the occupant with respect to the ground.

Both wheelchair motion and steering is achieved through a common front wheel drive mechanism 30, (see FIG. 4) one mechanism for each front wheel, providing a differential drive. Each drive mechanism includes a 12-volt DC motor 32 which drives its respective wheel through a helical gear 34 and belt drive 36. Both drive motors 32 should be balanced to enhance linear movement of the wheelchair. The differential drive is controlled by the occupant in a manner to be described.

Each front wheel drive mechanism 30 is supported on a frame pivotally mounted at 38 between its respective fender walls. A tension mechanism 40, readily accessible to the occupant on top of each fender, controls the pivotal position of the drive assembly, and, therefore, the tension on the respective belt drive 36.

A cushioned seat 42 is fixedly bolted to the chassis body by an aft bracket 44 and at the forward end to a triangular extension 46 of each fender. A pair of arm rests 47 having uprights 48 are mounted in sockets 49 on fender extensions 46, the arms and uprights being detachably removable from said sockets to permit lateral displacement of the occupant from the seat should be need arise. A padded knee restraint 50 is hingedly mounted by sockets 51 bolted to the front wall of fender extension 46 to enable the knee restraint to swing in and out of the position.

Figure 4:
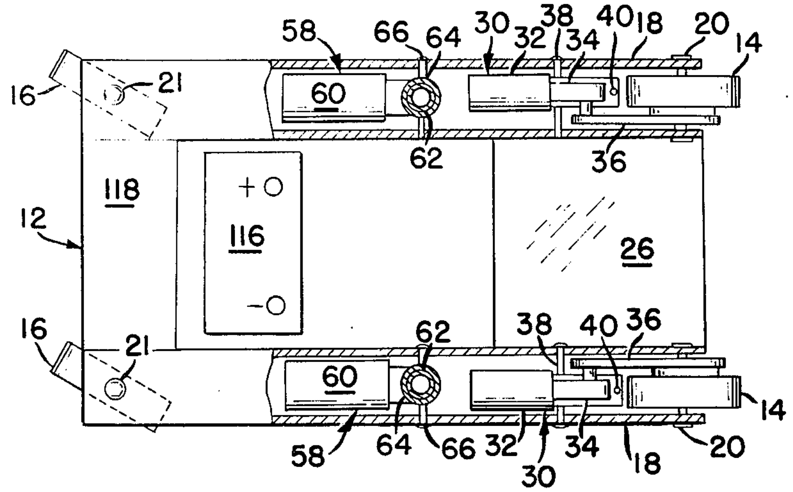
FIG. 4 is a top plan view of the wheelchair chassis taken along line IV—IV of FIG. 2.

The occupant is elevated and lowered to a standing position from and to fixed seat 42 by a composite lifting mechanism 52, best shown in FIGS. 3 and 4, which is an important contribution of this invention. The lifting mechanism generally comprises a backrest assembly 54, a linkage system 56, and a lifting actuator 58. An identical linkage system is provided for each side of the wheelchair. Each linkage system 56 consists of four pivotable links which includes a fixed end link 56*a*, in the form of a plate bolted to the top wall of fender extension 46, a movable end link 56*b*, and a pair of side links 56*c* and 56*d* pivotally mounted to the end links. Movable end link 56*b* is preferably arcuate to avoid pinching of the occupant's fingers with the side links when the linkage is in the elevated position.

Each linkage system 56, and its associated backrest assembly 54 mounted between the pair of linkage systems, is elevated and lowered by a separate lifting actuator 58, (see FIGS. 1 and 4) which may be a commercially available unit under the name "Mini-Pac" manufactured by the Duff-Norton Company of Charlotte, N.C. Each actuator assembly is housed withn its respective fender (FIGS. 3 and 4) and comprises a 12-volt DC motor 60 and a vertically extending double lead screw 62 driven through a hypoid gear set 64, the entire assembly being pivotally mounted to the respective fenders on pivot 66. The upper end of double lead screw 62 is pivotally connected by a clevis 68 to its respective linkage system, such as to side link 56*d*. Side link 56*d* is laterally offset from side link 56*c* to allow passage of the upper end of the screw. The exact location of pivotal connection 68 on the linkage depends on the stroke of the actuator, which in the illustrated embodiment has a six inch stroke. The DC motors are powered and controlled by the occupant in a manner to be described. In this application, the matching of both actuator motors 60, while desirable, is not critical because of the structural strength of the respective linkage systems 56, and, the fact that each actuator drive has a built-in friction-disc drive.

A flexible lifting seat strap 70 is attached preferably to corresponding side links 56*d* of each linkage set, best seen in FIGS. 1 and 2. Seat strap 70 normally extends across the fixed seat 42 and is normally positioned between the fixed seat and the occupant's lower torso when he is in a seat position. Lifting strap 70 is preferably made of thin fabric material, and is preferably relatively narrow, i.e., 5 or 6 inches to contact only a limited area of the occupant's body. When the linkage is elevated, strap 70 supports the occupant's body as it is lifted upwardly off and away from fixed seat 42 in such a manner that there is a minimum relative movement between the strap and the garment of the occupant, that may otherwise cause the clothes to creep, creating discomfort and possibly embarrassment to the occupant.

Figure 5:
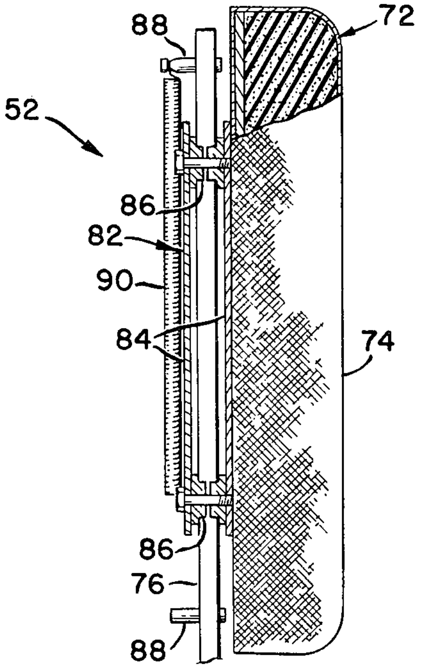
FIG. 5 is a longitudinal section through the backrest and its support showing the vertically slidable mounting, taken along line V—V of FIG. 1.

Backrest assemby 54 comprises a support 72 and a padded backrest 74 mounted thereto. As best seen in FIGS. 1 and 5, support 72 consists of a central vertical bar 76 bolted at its lower end at 78 to a pair of spaced horizontal spreader bars 80 secured to and supported between the respective movable end links 56*b* of the linkage sets. Backrest 74 is mounted in a vertically slidable relationship with respect to support bar 76, by a carriage 82 bolted to the backrest shown in FIG. 1 and in detail in FIG. 5. The slidable feature is important, as will be explained under "Operation" to eliminate relative movement between backrest and the occupant's back that might otherwise dishevel the clothes of the occupant during the lifting and lowering maneuvers. As shown in FIG. 5, carriage 82 is constructed of inner and outer spaced plates 84 between which are mounted two pairs of spaced upper and lower rollers 86 which are in rolling contact with the longitudinal edges of support bar 76 that extends between spaced plates 84. Vertical movement of carriage 82 on support bar 76 is limited by a pair of stops 88 mounted on the support bar and adapted to abut respective upper and lower ends of the carriage. A tension coil spring 90 is secured at one end to the bottom of the carriage and at the other end to the upper stop 88 for the purpose of biasing carriage 82 between the two stops 88.

A bumper 91 is mounted on bracket 44 adapted to be engaged by the bottom end of support bar 76 to cushion the shock when the backrest is lowered back to the seated position.

A pair of padded chest restraints 92 having a slotted angle support 94 are each mounted to a respective plate secured on each side of the back of backrest 74, and are adjustable vertically and horizontally to accommodate occupants having different body measurements.

Another important contribution is the use of a back-pack type of strap to support the upper torso in lieu of a chest strap.

A pair of this type of shoulder straps 96 are jointly secured at one adjustable end to upper stop 88 on the back of backrest 74, and have opposite adjustable ends secured to the respective chest restraints 92. A pair of hip restraints 98 are each pivotally mounted by a bracket 99 respectively to a pair of clamps 100 which are slidably supported on horizontal bars 80, and adjustable therewith, to accommodate occupants of different widths. Hip restraints can be piovtted out of the way with the linkage in the seated position (see FIG. 2).

It should be noted that lifting mechanism 52 is not limited to use on the particular wheelchair illustrated in the drawings, and, in fact, can be adapted for use on existing conventional wheelchairs or standing-aids.

Power to the wheelchair and to lifting mechanism 52 is controlled by a hand control box 102 mounted on a standard 104 supported to one of the fenders, such as the right fender in the drawings. Standard 104 is preferably telescopic in construction to enable control box 102 to be raised as a convenience to accommodate the occupant in the standing position. Also, standard 104 is pivotally mounted at 106 to enable the occupant's hand readily to remain on the control box for manipulation throughout the lifting and lowering maneuver.

Motors 32 of the differential drive mechanism to front wheels 14 are preferably controlled by a joy-stick 108 mounted on the top of control box 102. Actuators 58 for the lifting and lowering of the lifting mechanism 52 are controlled by switches 110 through a polarity reversing relay 114.

Figure 6:
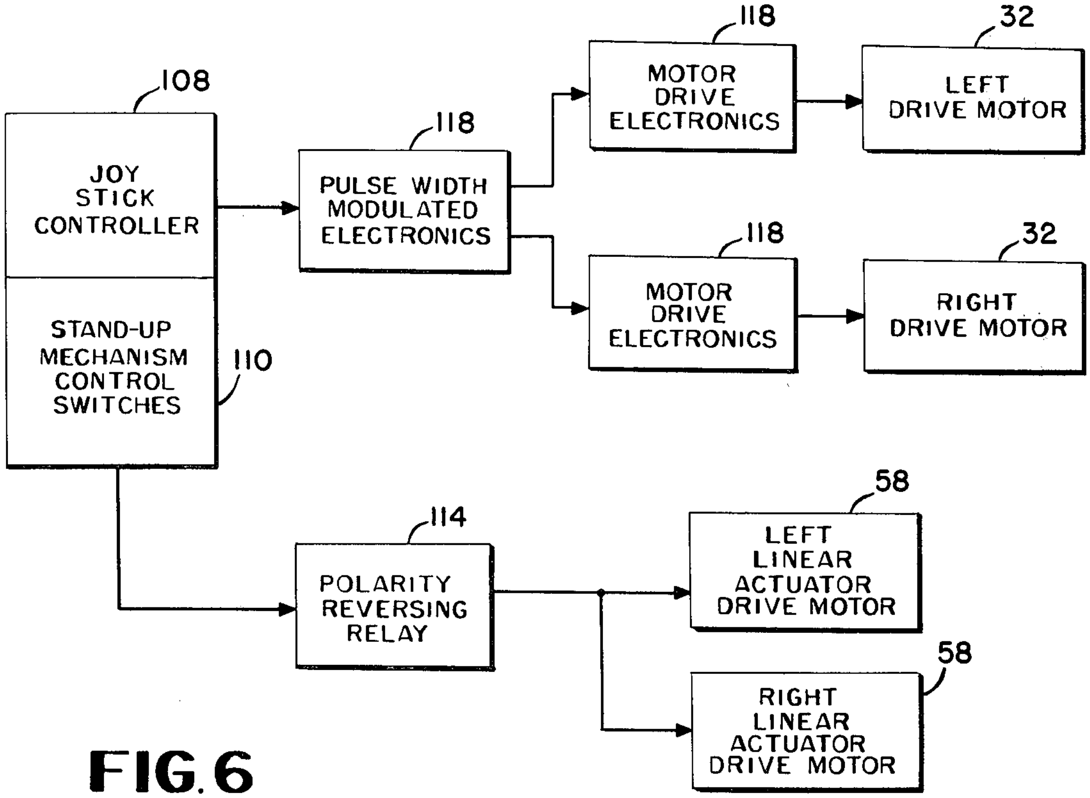
FIG. 6 is a block diagram showing the electrical circuit for the various components.

FIG. 6 shows a simple block diagram of the various electrical components. The DC power source for all the electrical components is a conventional auto battery 116 mounted on the wheelchair chassis beneath fixed seat 42. The electronic circuits are housed in an electronic chassis 118 at the rear of the wheelchair chassis.

OPERATION

The motion of wheelchair 10 is controlled by joystick 108 mounted on control box 102 for differentially driving front wheels 14 with rear wheels 116 freely castoring. Tension adjustment 40 for each of the front wheel belt drive 36 is conveniently accessible to the occupant on top of each fender. It should be noticed that the fenders 22 enclose all of the drive mechanism providing safety as well as an aesthetically appealing low profile with the lowered platform 26 between the front wheels. With the occupant seated on fixed seat 42 (FIG. 2), flexible seat strap 70 conforms to cushioned fixed seat 42 and to the lower torso of the occupant therein seated with no physical discomfort to the occupant.

When a standing position is desired (FIG. 1), the occupant need only continually press the lifting switch 110 on control box 102. Should the invalid "black-out", release of switch 110 will automatically stop the lifting or lowering movement. Lifting actuators 58 commence lifting linkage systems 56 and the backrest assembly 54. Although the linkage starts to move, because of the slack in the lifting strap there is a slight delay before the occupant's body starts to be lifted, and this initial movement of the linkage is absorbed by carriage 82 which allows the support bar 76 to move up freely through carriage 82 without moving backrest 74. Accordingly, there is no relative movement between backrest 74 and the back of the occupant which otherwise would cause the occupant's clothing to be pulled up over the occupant's body.

Linkages 56 are also designed to swing the backrest assembly upwardly along with the occupant with a minimum relative movement between the occupant's back and the backrest. The path of the end links **56*b* from the sitting position to the standing position are shown in phantom lines 120 in FIG. 3. A similar relationship occurs between the narrow seat strap 70 and the lower torso of the occupant being supported thereby. It should be noted that in most instances invalids have a frail physique with their clothes usually fitting rather loosely, and, thus, the ruffling and shifting of the clothes caused by any relative movement between the body and the body contacting parts of the lifting mechanism 52** can be a significant source of annoyance and possible embarrassment to the occupant, which, degrades the performance of the wheelchair.

In addition to seat strap 70, the occupant is also supported in the full standing position (FIG. 1) by shoulder straps 96, chest restraints 92, hip restraints 98, and knee restraints 48. It is important that shoulder straps 96 support the invalid in the shoulder area, vice the chest area, where the majority of the paraplegics retain body sensitivity which is not necessarily the case in the chest area. Thus, the invalid can be readily aware if the shoulder straps are too tight and are effecting his blood circulation. With the invalid standing on platform 26, the longitudinal centerline of his body passes substantially through the rotational axis of the front end of the wheelchair which enhances both stability and traction, and reduces the tendency of the body to lurch, especially important when the wheelchair is maneuvered by the occupant in the standing position.

The presence of fixed seat 42 and arm rests 47 when the occupant is standing gives him a psychlogical boost in knowing that should the lifting mechanism fail that he can return safely to his normal sitting position.

Thus, the novel wheelchair provides many psychological and physiological advantages over the conventional wheelchairs. The occupant is comfortably supported in a standing position where he is able to accomplish useful work, as shown in FIG. 1, moving the wheelchair in this position with maximum stability and confidence. All the body fixtures can be adjusted to accommodate individual body configurations ensuring maximum confort to the invalid.

Obviously many modifications and variations of the present invention are possible in the light of the above teachings. It is therefore to be understood that within the scope of the appended claims the invention may be practiced otherwise than as specifically described.

What is claimed is:

1. An invalid stand-aid wheelchair including:

a chassis having front and rear wheels;

a motor mounted on the chassis for driving said wheels;

said chassis having a pivotally mounted knee rest;

a seat fixedly mounted on the chassis for supporting the invalid in a sitting position;

a flexible lifting strap for supporting the invalid in lifting and standing positions, said lifting strap in a seated position lying in contact with and conforming to said fixed seat;

articulated linkage connected to the chassis for supporting the lifting strap;

a freely movable backrest assembly mounted on said linkage and supporting the back of the invalid throughout a lifting and lowering movement from the seated position to and from a standing position;

means for clamping the invalid against the backrest; and means connected between the chassis and the linkage for moving said backrest and lifting strap to create a minimum sliding movement between the surface of the backrest and the surface of the lifting strap to avoid friction with the respective portions of the invalid's body that may cause irritation and disheveling of his clothes.

2. The wheelchair of claim 1 wherein each of said front wheels is provided with a separate DC motor.

3. The wheelchair of claim 2 wherein a platform is positioned substantially over the turning axis of the front wheels so that the vertical centerline of the invalid in a standing position is substantially aligned with said axis.

4. The wheelchair of claim 1 wherein a control station is provided for said motor, said control station being supported on the top of a vertical standard pivotally supported at its lower end to the chassis, whereby the invalid's hand can remain on the control station at all times during the lifting and lowering maneuver.

5. The wheelchair of claim 4 wherein said standard is variable in length.

6. The wheelchair of claim 1 wherein the chassis is provided with fenders to enclose the motor and drive train.

* * * * *